United States Patent
Jenkins et al.

(10) Patent No.: US 9,050,740 B2
(45) Date of Patent: Jun. 9, 2015

(54) FORMING NON-UNIFORM OPTICAL GUIDING STRUCTURES

(75) Inventors: Kurt Allen Jenkins, Sammamish, WA (US); Rajesh Manohar Dighde, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 371 days.

(21) Appl. No.: 13/111,242

(22) Filed: May 19, 2011

(65) Prior Publication Data

US 2012/0292792 A1    Nov. 22, 2012

(51) Int. Cl.
| | | |
|---|---|---|
| B29D 11/00 | (2006.01) |
| B29C 33/38 | (2006.01) |
| B29C 37/00 | (2006.01) |
| B29C 33/42 | (2006.01) |
| B29C 39/02 | (2006.01) |
| B29L 11/00 | (2006.01) |

(52) U.S. Cl.
CPC .......... B29C 37/005 (2013.01); B29D 11/0048 (2013.01); B29D 11/0074 (2013.01); *B29L 2011/0016* (2013.01); *B29C 33/38* (2013.01); *B29C 33/424* (2013.01); *B29K 2995/0097* (2013.01); *B29C 39/021* (2013.01)

(58) Field of Classification Search
CPC ................... B29D 11/00413; B29D 11/00663; B29D 11/00528; B29D 11/0049; B29C 33/38
USPC ........ 264/1.1, 2.5, 1.24, 219, 297.4; 425/175, 425/808; 249/129, 134
See application file for complete search history.

(56) References Cited

U.S. PATENT DOCUMENTS

| | | | |
|---|---|---|---|
| 1,175,356 A | * | 3/1916 | Hollis ........................ 264/297.4 |
| 6,222,971 B1 | | 4/2001 | Veligdan et al. |
| 6,871,976 B2 | | 3/2005 | Niida et al. |
| 7,317,182 B2 | | 1/2008 | Schultz et al. |
| 7,732,828 B2 | | 6/2010 | Hung |
| 2003/0020210 A1 | * | 1/2003 | Robinson et al. ............. 264/236 |
| 2009/0219253 A1 | | 9/2009 | Izadi et al. |
| 2009/0322794 A1 | | 12/2009 | Lowe et al. |
| 2010/0133422 A1 | | 6/2010 | Lin et al. |
| 2010/0183263 A1 | | 7/2010 | Lin |
| 2010/0300608 A1 | | 12/2010 | Emerton et al. |

OTHER PUBLICATIONS

Tribastone, et al., "An Introduction to the Design, Manufacture and Application of Plastic Optics", Retrieved at <<http://www.apol-looptical.com/htdocs/media/aos_technology/articles/photonics_article.pdf>>, 2001, pp. 10.

* cited by examiner

*Primary Examiner* — Mathieu D. Vargot
(74) *Attorney, Agent, or Firm* — Jeremy Snodgrass; Judy Yee; Micky Minhas

(57) ABSTRACT

Embodiments are disclosed that relate to casting of an optical part having a non-uniform thickness. For example, one disclosed embodiment provides a method for casting an optical part having a non-uniform thickness, the method including adding a fluid material into a first cavity and into a second cavity separated from the first cavity by a separator. The first and second cavities may each have a non-uniform thickness and the separator may have a configuration complementary to shapes of the first and second cavities such that the first cavity, the second cavity, and the separator form a combined structure having a uniform thickness during a casting process. The method further comprises solidifying the fluid material in the first and second cavities to form the first and second optical parts.

18 Claims, 4 Drawing Sheets

FORMING NON-UNIFORM OPTICAL GUIDING STRUCTURES

BACKGROUND

Casting may involve adding a fluid material to a mold cavity and then allowing the fluid material to solidify into a part having the shape of the mold cavity. Depending upon the materials used and the parts being formed, casting may pose various challenges. For example, some materials, such as plastics, may shrink while solidifying due to chemical and thermal changes. As the magnitude of such shrinkage is dependent upon a thickness of the material, various portions of a non-uniform part may shrink different amounts and/or at different rates, thereby compounding the difficulties in casting precision parts.

SUMMARY

Various embodiments related to casting of precision optical parts having non-uniform thicknesses are disclosed herein. For example, one disclosed embodiment provides a method for casting a first optical part and a second optical part each having a non-uniform thickness. The method comprises adding a fluid material into a first cavity and into a second cavity separated from the first cavity by a separator. The first and second cavities each have a non-uniform thickness, and the separator has a configuration complementary to shapes of the first and second cavities such that the first cavity, second cavity, and the separator form a combined structure having a uniform thickness during a casting process. The method further comprises solidifying the fluid material in the first and second cavities to form the first and second optical parts.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
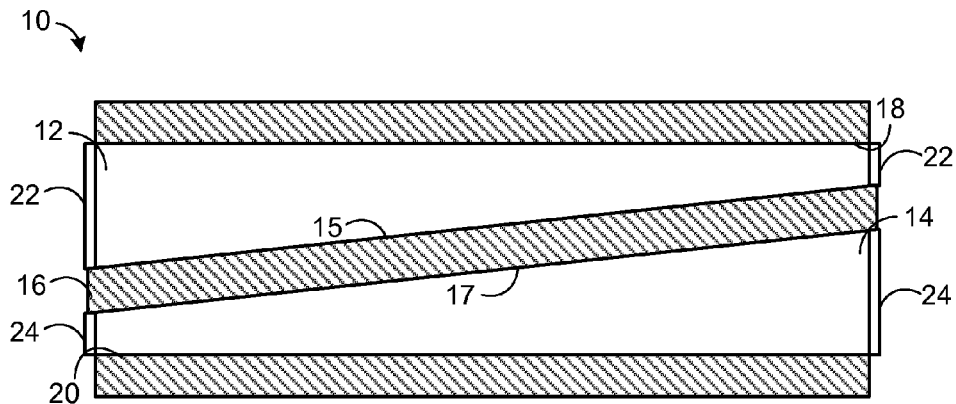
FIGS. 1-3 show sectional views of an embodiment of an example casting device at various points in a casting process.

Casting a part having a non-uniform thickness, such as an optical wedge formed from a polymer material, may be challenging in that materials used to form the part may shrink while solidifying. As mentioned above, this shrinkage may be uneven in magnitude and/or may occur at an uneven rate due to the non-uniform thickness of the part. Such non-uniform shrinkage may cause unequal stress across the part during the solidification process. This may lead to various problems. For example, casting of precision optical parts, such as optical wedges that have highly smooth surfaces, may involve the use of float glass or other brittle material as casting surfaces. Such casting surfaces may be prone to breakage when curing a non-uniform part, particularly large non-uniform parts, due to uneven stress applied across the casting surface as the non-uniform part shrinks during cooling of the cast parts. Another manifestation of unevenly applied and residual stress after cooling is warpage of the non-uniform part.

Accordingly, embodiments are disclosed herein that may facilitate the casting of a non-uniform part. For example, in one embodiment, a first part and a second part each having a non-uniform thickness are cast via a casting device having a first cavity and a second cavity separated by a separator. The first and second cavities may each have a non-uniform thickness. Further, the first and second cavities have a configuration (e.g. shape and/or placement) complementary to one another such that the cavities form a combined structure having a uniform thickness of curable material during a curing process. In this manner, the curing material within the mold may have uniform thickness and therefore uniform shrinkage and resulting stress is applied across the parts during the casting process. This may help to reduce the likelihood that brittle casting surfaces will break during casting due to non-uniform shrinkage, and may also prevent or minimize warpage of the non-uniform parts.

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included herein are schematic and generally not drawn to scale. Rather, the various drawing scales, aspect ratios, and numbers of components shown in the figures may be purposely distorted to make certain features or relationships easier to see.

Figure 2:
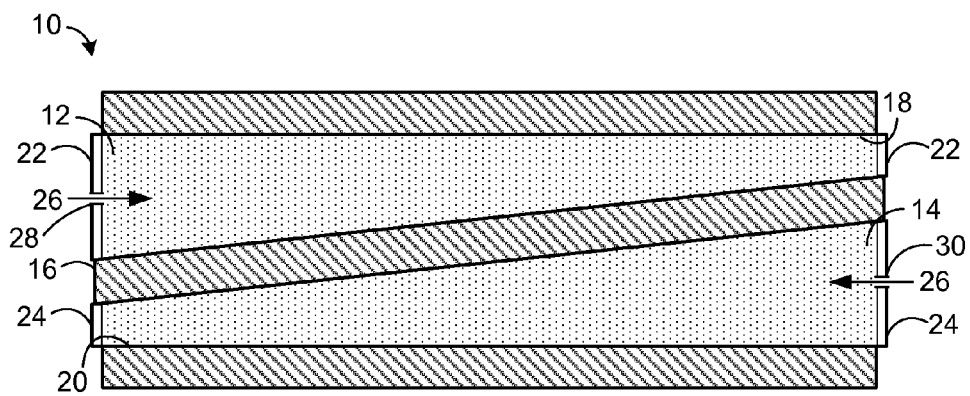
Figure 3:
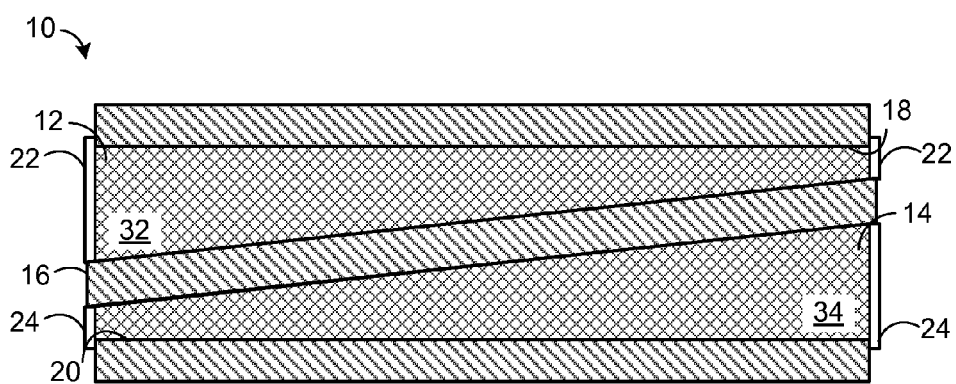

FIGS. 1-3 show a schematic cross-sectional depiction of an embodiment of a casting device 10 for casting a first part and a second part. The embodiment of FIGS. 1-3 depicts the first part and the second part as being optical wedges, an example of which is depicted as wedge 32 in FIG. 7.

Casting device 10 comprises a first cavity 12 having a non-uniform thickness and a second cavity 14 having a non-uniform thickness, and also comprises a separator 16 positioned between first cavity 12 and second cavity 14. In the depicted embodiment, first cavity 12 is defined by a first separator casting surface 15, a first outer casting surface 18, and a first gasket 22 surrounding a perimeter of first cavity 12. Likewise, second cavity 14 is defined by a second separator casting surface 17, a second outer casting surface 20, and a second gasket 24 surrounding a perimeter of second cavity 14. However, it will be understood that casting cavities may be defined by any other suitable surrounding structures.

In the embodiment illustrated in FIGS. 1-3, first and second cavities 12, 14 are each wedge-shaped, and separator 16 comprises a sheet-like structure that is positioned diagonally relative to first and second outer casting surfaces 18, 20. As such, separator 16 has a configuration complementary to first cavity 12 and second cavity 14 that forms a combined structure having a uniform thickness. In this embodiment, first cavity 12 is positioned in a complementary head-to-tail arrangement with second cavity 14. That is, the thick end of first cavity 12 is positioned adjacent to the thin end of second cavity 14, and the thick end of second cavity 14 is positioned adjacent to the thin end of first cavity 12. However, the cavities and separator may have any other suitable configuration, depending on the cavity shapes, that produces a combined structure with a uniform thickness.

Turning to FIG. 2, the casting device 10 is shown during a casting process and depicts a fluid material 26 added to the device. Fluid material 26 may be added to first and second cavities 12, 14 through one or more fill holes 28, 30. For the purpose of illustration, these are illustrated in FIG. 2 as being located in gaskets 22, 24 at a thick side of each cavity, but it will be understood that fill holes 28, 30 may have any suitable location. Fluid material 26 may be of a quantity to entirely fill first and second cavities 12, 14.

Fluid material 26 may comprise any suitable material. For example, in the case of an optical wedge/lens structure, fluid material 26 may comprise a transparent curable monomer material, such as a poly(methyl methacrylate) (PMMA) precursor or any other suitable material or materials. It will be understood that various other compounds may be added to the curable material, such as polymerization initiators, etc. to impart desired physical and/or chemical properties to the curable material.

FIG. 3 illustrates solid first and second parts 32, 34 after casting and before being removed from the casting device. As mentioned above, during the solidifying process, first and second parts 32, 34 may shrink. As such, first and second outer casting surfaces 18, 20 may be configured to be movable toward separator 16 during casting. Because first cavity 12, second cavity 14 and separator 16 form a combined structure that provides uniform thickness to the fluid material as it cures, pressure applied during the curing process may be uniform across the structure, thereby helping to maintain contact with the cast parts during curing while maintaining uniform pressure on the separator and casting surfaces. Likewise, in the embodiment of FIGS. 1-3, arranging the cavities in a head-to-tail configuration may allow shrinkage to occur uniformly across the combined structure during curing.

As mentioned above, first outer casting surface 18 and second outer casting surface 20 each may be comprised of a highly smooth material, such as float glass, in order to cast parts having optically smooth surfaces, with average roughness on the order of less than two nanometers. Further, separator 16 also may comprise float glass casting surfaces. For example, separator 16 may be formed from a single sheet of float glass. In other embodiments, first and second outer casting surfaces 18, and separator 16 may comprise any other suitable material or materials.

First and second gaskets 22, 24 may comprise any suitable material, including but not limited to materials such as silicone or neoprene. Further, gaskets 22, 24 may be separate from first and second casting surfaces 18, 20 and separator 16, or may be joined to either of these structures (and/or any other adjacent parts). In the embodiment of FIGS. 1-3, gaskets 22, 24 surround an outer perimeter of first and second outer casting surfaces 18, 20 respectively, and hold separator 16 in a desired position. In this manner, first and second outer casting surfaces 18, 20 may be moved toward separator 16 as the fluid material hardens and shrinks to maintain first and second outer casting surfaces 18, 20 in contact with parts 32, 34 as they harden.

While the embodiment of FIGS. 1-3 illustrates the casting of optical wedges, it will be understood that any suitable non-uniform part or parts may be formed by utilizing a separator having a complementary configuration to casting cavities such that the overall structure has a uniform thickness. Further, in some embodiments, as shown in FIGS. 1-3, the first and second parts may be two parts of a same shape, whereas in other embodiments the first and second cavities may define different parts. Likewise, while the depicted casting device comprises two cavities, it will be understood that any suitable number of cavities separated by any suitable number of separators arranged in an overall structure having a uniform thickness may be used to form any suitable number of parts during a casting process.

Figure 4:
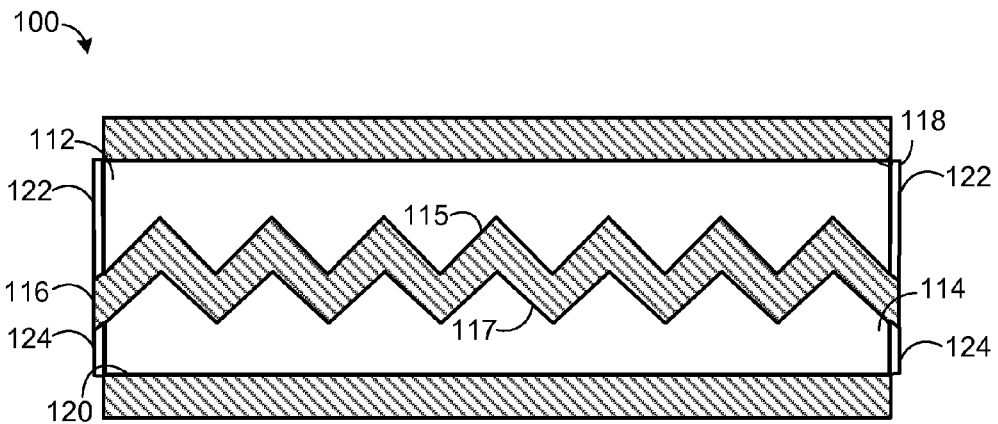
FIGS. 4-6 show sectional views of another embodiment of an example casting device at various points in a casting process.
Figure 5:
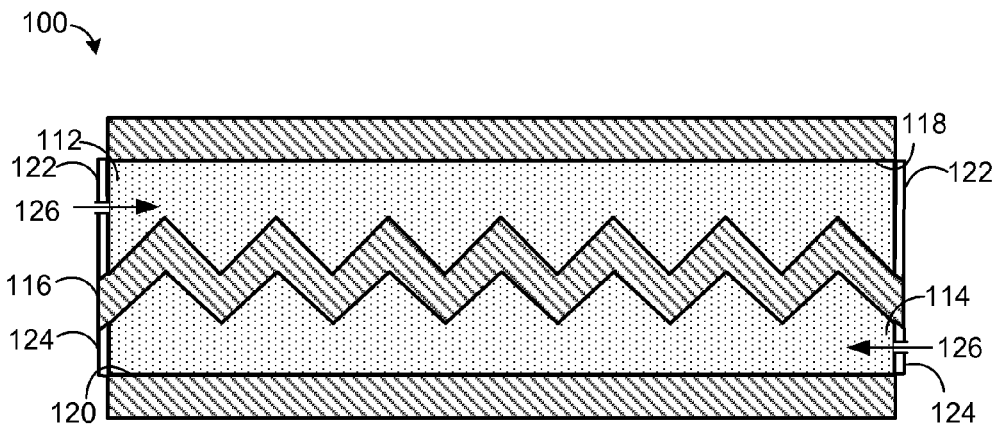
Figure 6:
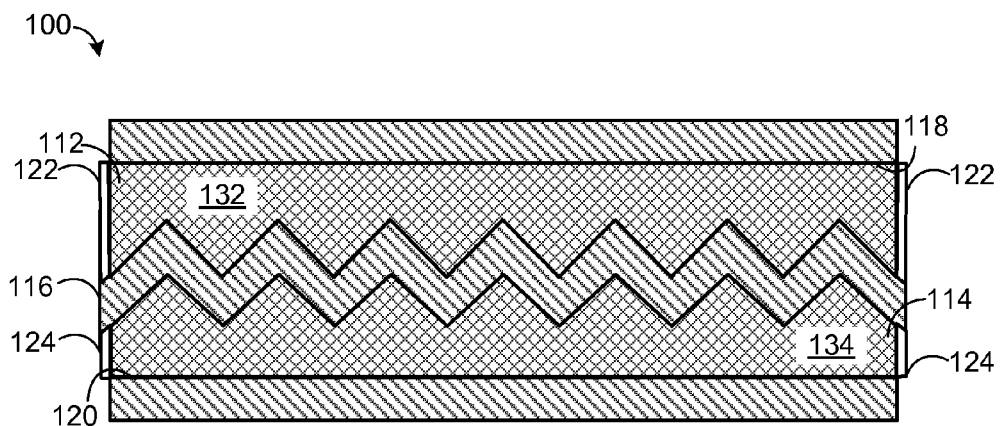

FIGS. 4-6 show sectional views of a casting device 100 according to another embodiment of the present disclosure. Similar to the device described in reference to FIGS. 1-3, casting device 100 comprises first and second cavities 112, 114 each having a non-uniform thickness, and first and second outer casting surfaces 118, 120. Additionally, first and second gaskets 122, 124 surround a perimeter of first and second cavities 112, 114.

However, unlike casting device 10, which has a planar separator, separator 116 comprises a first prismatic casting surface 115 and a second prismatic casting surface 117. First prismatic casting surface 115, together with first outer casting surface 118 and first gasket 122, define first cavity 112 in the form of a prismatic lens mold, while second prismatic casting surface 117, second outer casting surface 120, and second gasket 124 define second cavity 114 also in the form of a prismatic lens mold.

Figure 7:
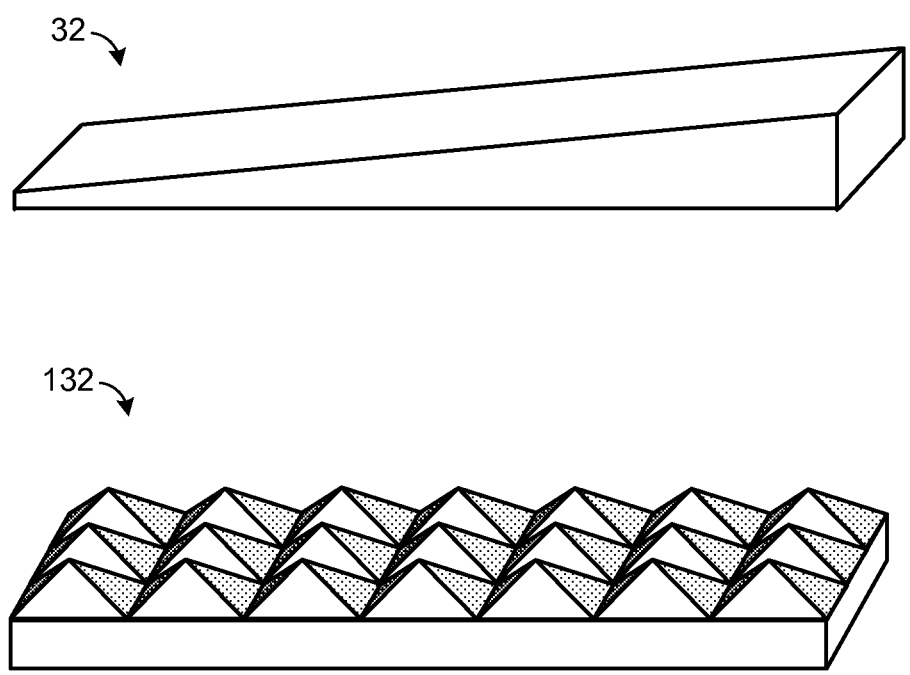
FIG. 7 shows a schematic depiction of embodiments of parts having non-uniform thickness cast via the embodiments of FIGS. 1 and 4.

As shown in FIG. 5, a fluid material 126 may be added to first and second cavities 112, 114 of casting device 100, and allowed to solidify into first and second solid parts, depicted in FIG. 6 as first and second prismatic lenses 132, 134. FIG. 7 depicts another view of prismatic lens 132. In FIGS. 4-6, it can be seen that separator 116 comprises a thickness profile complementary to the non-uniform thickness profiles of first and second cavities 112, 114 to form a combined structure having a uniform thickness of curable material as the material cures. This may facilitate the application of even pressure across the combined structure during the solidification process.

Figure 8:
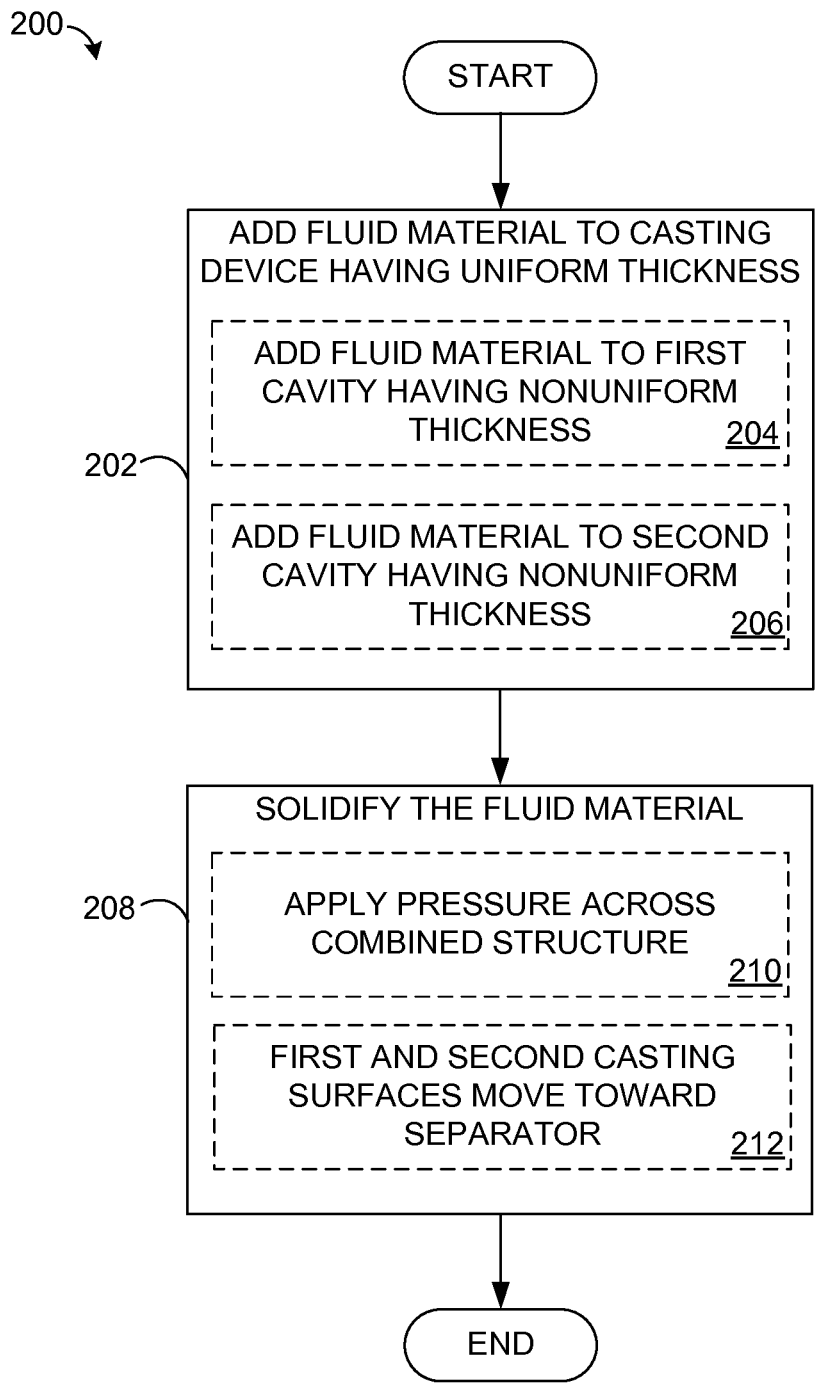
FIG. 8 is a flow chart depicting an embodiment of a method of casting a non-uniform part.

FIG. 8 is a flow chart depicting an embodiment of a method 200 for casting a first and second part having non-uniform thickness. Method 200 comprises, at 202, adding a fluid material to a casting device having a uniform thickness. The casting device comprises more than one cavity arranged to form a combined structure having a non-uniform thickness, as described above. As such, method 200 further comprises, at 204, adding the fluid material to a first cavity having a non-uniform thickness, and at 206, to a second cavity having a non-uniform thickness. The first and second cavities each may be wedge-shaped, for example, as described above with respect to FIG. 1, or may have any suitable shape. The first and second cavities are separated by a separator configured such that the separator, first cavity, and second cavity form a combined structure having a uniform thickness. In some embodiments, the first and second cavities may each be wedge-shaped, and may be arranged in a head-to-tail relationship. In other embodiments, the first and second cavities have any other suitable arrangement.

Next, at 208, method 200 comprises solidifying the fluid material to form a solid structure. The material may be solidified in any suitable manner, for example, via curing, and may include any suitable additives. In some embodiments, pressure may be applied to casting surfaces of the combined structure at 210 during solidification. Further, as indicated at 212, the casting surfaces may be moved toward the separator as the cast material shrinks during curing to maintain the surfaces in contact with the cast material. In this manner, uniform pressure may be applied to the casting surfaces and cast material during curing. This may facilitate the manufacturing of the cast parts, and also may help to avoid damaging fragile molding surfaces such as float glass.

While the depicted example embodiments show the casting of two like parts, it will be understood that two unlike parts also may be cast as described herein, with the use of an appropriately configured separator. Further, as mentioned above, in some embodiments, a casting apparatus may comprise three or more cavities that together form an overall structure having a uniform thickness.

It is thus to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for casting a first optical part and a second optical part each having a non-uniform thickness, the method comprising:
    adding a fluid material into a first cavity having a movable first casting surface and into a second cavity having a movable second casting surface, the first and second cavities separated by a separator, the first and second cavities each having a non-uniform thickness and the separator having a configuration complementary to shapes of the first and second cavities such that the first cavity, the second cavity, and the separator form a combined structure having a uniform thickness of curable material during a casting process;
    curing the fluid material in the first and second cavities to form the first and second optical parts; and
    moving the first casting surface and second casting surface toward the separator during the casting process as the fluid material cures and shrinks.

2. The method of claim 1, wherein adding the fluid material further comprises adding the fluid material into a first cavity having a first float glass casting surface and into a second cavity having a second float glass second casting surface, the separator being located between the first float glass casting surface and the second float glass casting surface.

3. The method of claim 2, wherein adding the fluid material to the first and second cavities separated by the separator further comprises adding the fluid material into the first and second cavities separated by a separator comprising float glass.

4. The method of claim 2, wherein adding the fluid material to the first and second cavities separated by the separator further comprises adding the fluid material into the first and second cavities separated by a sheet-like separator positioned diagonally relative to the first and second casting surfaces.

5. The method of claim 1, wherein curing the fluid material in the first and second cavities further comprises applying pressure across the combined structure.

6. The method of claim 1, wherein adding the fluid material to the first and second cavities separated by the separator further comprises adding the fluid material into first and second wedge-shaped cavities.

7. The method of claim 1, wherein adding the fluid material to the first and second cavities separated by the separator further comprises adding the fluid material to the first and second cavities having a head-to-tail configuration relative to each other.

8. The method of claim 1, wherein adding the fluid material further comprises adding a PMMA (poly(methyl methacrylate)) precursor to the first and second cavities.

9. A method for casting first and second optical parts, each optical part having a non-uniform thickness, the method comprising:
    adding a fluid material into a first cavity having a movable first casting surface and a second cavity having a movable second casting surface, the first and second cavities separated by a separator, the first and second cavities each having a non-uniform thickness and being arranged in a head-to-tail configuration to form a combined structure having a uniform thickness of curable material during a casting process;
    curing the fluid material in the first and second cavities to form the first and second optical parts; and
    moving the first casting surface and the second casting surface toward the separator during the casting process as the fluid material cures and shrinks.

10. The method of claim 9, wherein the first casting surface, the second casting surface, and the separator comprise float glass.

11. The method of claim 9, wherein adding the fluid material to the first and second cavities separated by the separator further comprises adding the fluid material to first and second wedge-shaped cavities.

12. The method of claim 9, wherein adding the fluid material further comprises adding a PMMA (poly(methyl methacrylate)) precursor to the first and second cavities.

13. The method of claim 9, wherein curing the fluid material in the first and second cavities further comprises applying pressure across the combined structure during curing.

14. A device for casting a first optical part and a second optical part each having a non-uniform thickness, the device comprising:
    a first cavity having a non-uniform thickness, the first cavity being at least partially defined by a movable first casting surface that is movable toward the separator and also at least partially defined by an interior side wall in contact with a perimeter of the movable first casting surface, the interior side wall having a surface configured to permit motion of the movable first casting surface along the interior side wall toward a separator;
    a second cavity having a non-uniform thickness, the second cavity being at least partially defined by a movable second casting surface and being separated by the separator from the first cavity; and
    the first cavity, second cavity, and separator forming a combined structure having a uniform combined thickness of the first cavity and the second cavity.

15. The device of claim 14, wherein the first cavity and the second cavity are each wedge-shaped.

16. The device of claim 15, wherein the first cavity and the second cavity are arranged in a head-to-tail configuration relative to each other.

17. The device of claim 14, wherein:
    the first cavity is defined by a first outer casting surface, a first surface of the separator, and a first gasket, the first gasket surrounding a perimeter of the first cavity; and
    the second cavity is defined by a second outer casting surface, a second surface of the separator, and a second gasket, the second gasket surrounding a perimeter of the second cavity.

18. The device of claim 17, wherein the first casting surface, second casting surface, and separator each comprises float glass.

* * * * *